United States Patent
Pape et al.

(10) Patent No.: US 6,722,102 B1
(45) Date of Patent: *Apr. 20, 2004

(54) METHOD AND APPARATUS FOR APPLYING ARTICLES TO THERMOPLASTIC MATERIALS

(75) Inventors: Leslie Pape, South Lyon, MI (US); Robert Edwin Rochelle, South Lyon, MI (US)

(73) Assignee: Elopak AG, Glattbrugg (CH)

( * ) Notice: Subject to any disclaimer, the term of this patent is extended or adjusted under 35 U.S.C. 154(b) by 0 days.

This patent is subject to a terminal disclaimer.

(21) Appl. No.: 09/066,416
(22) PCT Filed: Oct. 30, 1996
(86) PCT No.: PCT/GB96/02651
§ 371 (c)(1),
(2), (4) Date: Jun. 8, 1998
(87) PCT Pub. No.: WO97/16302
PCT Pub. Date: May 9, 1997
(51) Int. Cl.[7] ............................ B65B 61/00; B65B 7/00
(52) U.S. Cl. ...................... 53/410; 53/412; 53/133.1; 53/133.2; 156/69; 156/309.9; 156/321; 156/322; 493/87
(58) Field of Search ................... 53/133.2, 133.1, 53/410, 412; 493/87, 156; 156/69, 309.9, 321, 322, 309.6

(56) References Cited

U.S. PATENT DOCUMENTS

| | | | | | |
|---|---|---|---|---|---|
| 3,498,868 A | * | 3/1970 | Saumsiegle | ............... | 156/309.9 |
| 4,507,168 A | * | 3/1985 | Konaka | ................... | 156/309.9 |
| 4,872,935 A | * | 10/1989 | Newkirk et al. | ......... | 156/309.9 |
| 5,152,438 A | * | 10/1992 | Gordon et al. | ................ | 156/69 |
| 5,267,934 A | * | 12/1993 | Pape et al. | ................. | 53/133.2 |
| 5,435,803 A | * | 7/1995 | Owen et al. | .................. | 493/87 |
| 5,716,471 A | * | 2/1998 | Pape | ........................... | 156/69 |

* cited by examiner

Primary Examiner—John Sipos
Assistant Examiner—Louis Huynh
(74) Attorney, Agent, or Firm—Reising, Ethington, Barnes, Kisselle, P.C.

(57) ABSTRACT

A method for securing thermoplastic pour spout fitments 22 to thermoplastic-coated containers 20, wherein at least a surface of the pour spout fitment 22 is heated remotely at heating stations 42–46 to a temperature significantly below the melting point of the thermoplastic fitment. When the heated fitment surface is applied to a selected surface of an erected, thermoplastic-coated container 20, the heat energy is transferred to the latter surface to an extent capable of activating the thermoplastic coating thereon. Upon cooling, the fitment 22 and the container surface are bonded together.

23 Claims, 9 Drawing Sheets

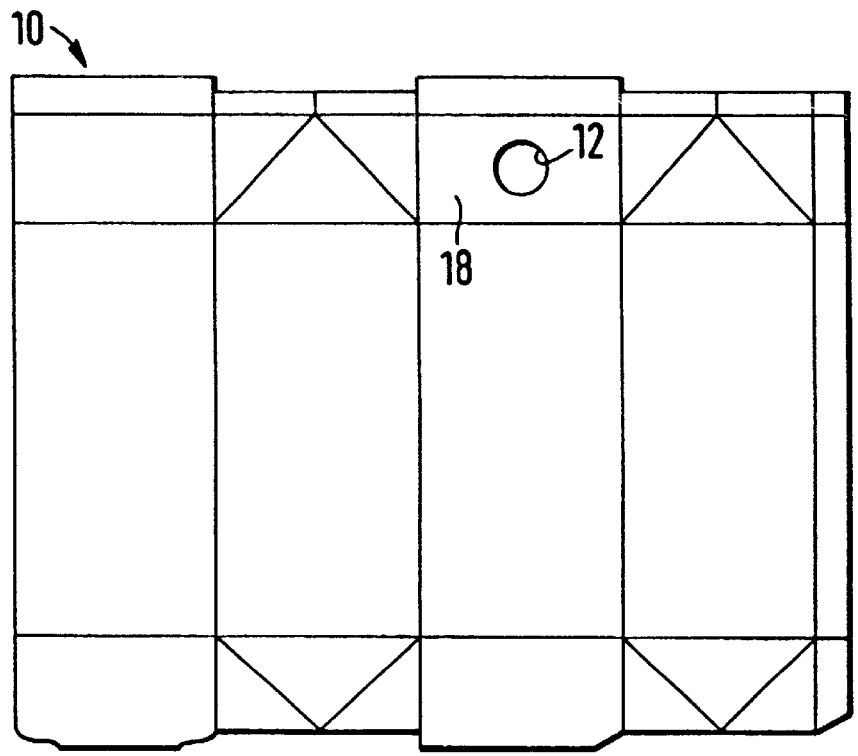
Fig. 1
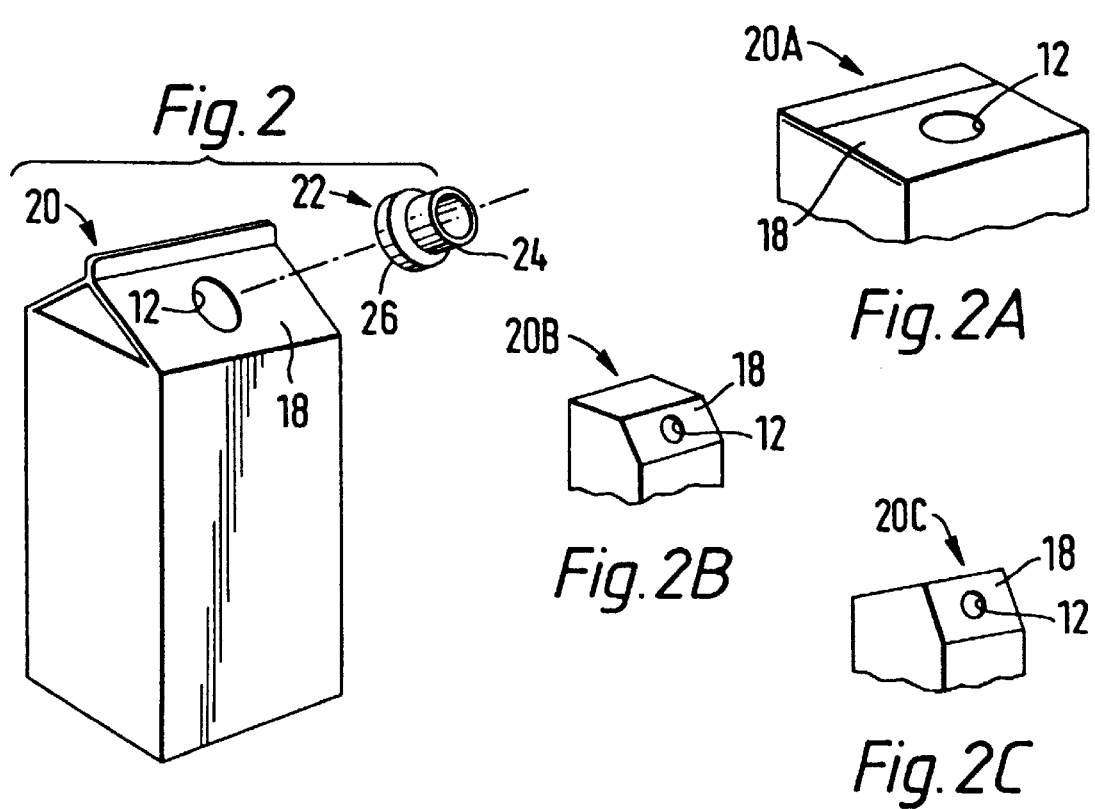
Fig. 2
Fig. 2A
Fig. 2B
Fig. 2C

METHOD AND APPARATUS FOR APPLYING ARTICLES TO THERMOPLASTIC MATERIALS

This application is a 371 of PCT/GB96/02651 filed Oct. 30, 1996, which claims priority to U.S. patent application Ser. No. 08/549,972 filed Oct. 30, 1995, now U.S. Pat. No. 5,716,471 issued Feb. 19, 1998.

BACKGROUND ART

It is known from U.S. Pat. No. 3,498,868 to bond a flange of a plastics pouring spout to a two-ply thin gauge plastics film of a bag. An annular area of an axially inner surface of a flange of the spout is so selected for heating that the non-heated areas surrounding or close to the heated area are sufficient to prevent distortion of the shape of the flange, thus maintaining the flange in the shape in which it has been moulded. At this heated area is a sufficient mass of plastics material that a heat reservoir is created which maintains some of the initially supplied heat while the fitment is being moved from a flange-heating station to a joining station where the plastics film is to be applied. The heat carried is sufficient that merely a sufficiently light pressure to only maintain contact between the engaged film and the heated area will be adequate to achieve a joining between the two. At the flange-heating station the spout is lifted by a plunger into contact with an electrical, annular, heating element, to apply the element to the area to be heated; the surface temperature of the element is above the fusion temperature of the plastics of the flange so as quickly to heat this annular area above its melting point [for example may be approximately 193° C. (380° F.) with polyethylene (PE)] and yet, it is stated, the flange is so supported by the non-heated areas of the flange and the plunger surface that the spout remains undistorted. The contact of the element with the flange is of a short duration consistent with lack of distortion of the plastics material of the flange. In some cases, it may be necessary to apply heat to the plastics material from both sides. At the joining station, the spout is raised by another plunger through an opening in the film and an annular pressing element is brought into light contact with the film to urge it against the flange. If the flange and the two-ply film thicknesses are such that the flange does not have enough heat at engagement to completely activate the thin film, a minimum amount of heat would be added to the film, as for example 127° C. (260° F.) for PE by providing electrical heating of the pressing element. The heat provided by the latter electrical heating is equal to or less than the heat applied to the flange at the flange-heating station and the pressure is very light. The heat will be only sufficient to cause the plastics film to become fluid or mobile, sufficient heat having been retained in the heated part of the flange so that, over a short dwell time, molecular diffusion will take place on the interface and thereby provide a weld or joining of the parts one to the other. Although the temperature applied to the flange may be well above the melting point of the flange, the subsequent heat at the point of joining of the thin plastic film and the flange will be only sufficient to have an interfacial temperature in the fluid region of the plastics. Under some conditions, where an extremely thin plastics film is to be joined, sufficient heat may be available from the thick flange to achieve fluidity in the film without the application of heat at the joining station.

U.S. Pat. No. 3,231,444 discloses a method of heat-sealing a thermoplastic pour spout fitment to the exterior surface of one of two adjacent sheets of thermoplastic material to form a bag. A length of thermoplastic bag tubing is heat-sealed at both ends. The fitment and the tubing are of compatible materials. Radiant heat, for example from an infra-red heater bar, is directed at the bottom surface of the fitment, which surface is formed with an annular rib, or a plurality of concentric annular ribs. Heat can also be provided by a hot plate in contact with the rib(s). The heat is applied for a length of time sufficient to reduce the rib(s) to a softened or molten state, appropriate for heat sealing. The fitment is then pressed against the outer surface of an upper wall of the bag, for example by means of an appropriately shaped anvil. To reduce the possibility of adherence at the interface of the two walls of the bag, a water-cooled chamber is placed in contact with the outer surface of the lower wall so as to conduct heat away from the interface. The or each rib, which is continuous so as to provide a liquid-tight seal between the bag and the fitment, is thereby fused to the outer surface of the upper wall of the bag. Immediately prior to filling the bag, the bag wall at the opening of the fitment is punctured to permit filling of the bag through the fitment and then the fitment is closed by a cap. The fitment surface against which the heat is directed is of a large area relative to the cross-sectional area of the rib(s), so that only the rib(s) is/are reduced to a softened or molten state.

Hereto, pour spout fitments have been secured to thermoplastic-coated container panels by various methods.

In U.S. Pat. No. 4,813,578, the following method is employed: A mandrel is inserted into the interior of the still-open mouth of the container, with the mandrel abutting the interior surface of a barrier layer and forming a back-up support. Hot air or radiant heat is applied to the external surface of a gable top wall immediately around an opening to thereby soften the polyethylene coating, with a pour spout fitment flange placed on the softened layer to thereby adhere the flange to the wall. An external mandrel is also employed to press the assembly against the internally positioned mandrel. This pressure is maintained until the coating cools and thereby effects permanent adhesion of the flange to the wall. U.S. Pat. No. 4,813,578 discloses that other methods, such as ultrasonic adhesion and impulse heating, may be employed.

U.S. Pat. No. 5,249,695 merely recites that attachment to the polymer-coated paperboard panel is accomplished by welding or otherwise adhering a spout fitment flange to the polymer coating.

U.S. Pat. No. 5,110,041 discloses that dual lanes of pour spout fitment sealing apparatus are integrated in line with conventional form/fill/seal production lines. Pre-sided carton blanks are opened to tube configurations and placed in flight pockets on an indexing conveyor for step-wise advance to each fitment sealing apparatus. At the sealing apparatus, the fitments are gravity-fed down a track and released one-by-one by an escapement to a pair of fitment retaining clamps positioned in front of the spout hole of each carton blank advanced to the sealing apparatus. A timing control causes the clamps to move apart at the same time as an ultrasonic sealing horn advances to press the fitment into contact with the outside thermoplastics layer of the blank and an anvil is inserted into the blank. The horn is energized to seal the fitment to the blank, the horn and the anvil are retracted, and the clamps are moved back to receive the next fitment. In an alternative embodiment, the fitment is sealed to the outside layer by hot-metal adhesive which is applied to the sealing surface of the fitment just prior to pressing the fitment against the outside layer. Heat may be applied to tackify the adhesive by a hot anvil or sealing head equipped with heating elements.

U.S. Pat. No. 4,964,562 and U.S. Pat. No. 5,152,438 each utilize an ultrasonic sealing horn and a back-up support mandrel operative around respective pouring apertures.

U.S. Pat. No. 4,948,015 discloses the use of an ultrasonic horn to bond a flange of a pour spout fitment to an inner or back surface of a container panel around a pouring aperture.

U.S. Pat. No. 4,669,640 suggests fusing a pour spout flange to an inside surface of a carton gable top either thermally or ultrasonically.

U.S. Pat. No. 5,088,643 states that a pour spout fitment is preferably adhered to the outer surface of a container panel by impulse heating under pressure such as ultrasonic sealing although other methods may be used as desired.

DE-A-3838739 discloses a method in which a thermoplastic disc is applied to the outside thermoplastic layer of the laminate of the container so that the middle of the disc is sealed to the thermoplastic inside layer of the container through an opening through the paperboard layer. Then the disc is heated so that it becomes plastic and a tubular spout is inserted into the opening so that the thermoplastics of the disc is sealingly present between the inner edge of the opening and the outside of the spout.

U.S. Pat. No. 4,925,034, WO-A-93/02923 and WO-A-95/21734 disclose adhesively bonding a pour spout fitment by a hot melt glue to a top outer surface of a container. W093/02923 discloses a method which includes applying a hot-melt adhesive to a fitment, allowing the adhesive to solidify, introducing the fitment to a fitment applicator machine, indexing the fitment through a heating station of the machine, and reactivating the adhesive by radiant preheating and convection final heating thereat, mechanically picking up the fitment, introducing the filled and sealed container to the machine, and conveying the container to a position in which the fitment is placed on a container and attached thereto. After indexing through the heating station, where the hot-melt adhesive is reactivated, the fitments approach a rotating turret wheel via a heating station conveyor where they are grasped by pick-up devices mounted on the turret. The pick-up devices transfer the fitments to the containers where the fitments are then held in place on the containers by the pick-up devices until the fitments are fully adhered. The machine may be equipped with a programmed control system to indicate fault conditions. Various malfunctions may be indicated, such as: vibrating track (for fitments) empty, feeder hopper (for fitments) empty, hopper low, fitment jam, low temperature, low air pressure, downstream jam, etc.

U.S. Pat. No. 5,101,999 suggests that a spout or closure be attached to a package too by any suitable means such as an adhesive applied to a bottom surface of the closure to be attached to the package top; it also suggests, where the package is coated with an outer thermoplastic layer of polyethylene, which discourages such adhesion, the use of perimeter cuts which may be serrated or applied as perforated cuts. Such serrations or perforated cuts need only penetrate the polyethylene outer layer to allow the adhesive to bond with the underlying carrier or paper layer.

U.S. Pat. No. 4,507,168 discloses attaching a pour spout fitment to the outside of a roof panel of a filled and sealed gable-top carton. A heater is inserted into a space between the fitment and the roof panel and heats both the bottom surface of the thermoplastics fitment and the outside thermoplastics coating of the roof panel; the heater is then withdrawn and the bottom surface of the fitment is applied to the outside coating.

DISCLOSURE OF THE INVENTION

According to one aspect of the present invention, there is provided a method of attaching an article to a thermoplastic layer of a laminate without using hot-melt adhesive, the method comprising the steps of:

provide an article;

heating a thermoplastic portion of the article;

placing that heated portion of the article on a portion of the thermoplastic layer to heat and thus activate said portion of the thermoplastic layer, said portion of the article being of a thermal capacity higher than that of said portion of the layer; and allowing or causing the heated portions of the article and the layer to cool, to thereby become bonded together;

characterized in that said heating is to a temperature no higher than the melting point of the thermoplastic of said portion of the article.

Owing to this aspect of the invention, it is possible to avoid the serious risk of distortion of the thermoplastic portion of the article which arises if that portion is heated to higher than the melting point of its thermoplastic. It is, surprisingly, feasible to heat that portion to a temperature no higher than one significantly below the melting point of its thermoplastic and still obtain good bonding together of the portions in question.

According to a second aspect of the present invention, there is provided a method of attaching an article to a thermoplastic material without using hot-melt adhesive, the method comprising the steps of:

providing an article in the form of a pour spout fitment;

heating a thermoplastic portion of the article, said heating being without contact between any heating member and said portion of the article;

placing that heated portion of the article on a portion of the thermoplastic material to heat and thus activate said portion of the thermoplastic material, and allowing or causing the heated portions of said article and said material to cool, to thereby become bonded together, characterized in that said thermoplastic material is a thermoplastic coating on a paperboard layer of a laminate in the form of an erected container.

Owing to this aspect of the invention, at is possible to avoid the serious risk of distortion of the thermoplastic portion of the pour spout fitment which arises if that portion is contacted by a heating member. Furthermore, there is less need for the heating means to be shaped to suit the shape of the fitment. Radiant heating or direct heating by streams of hot gaseous fluid is particularly suitable.

According to a third aspect of the present invention, there is provided a method of attaching an article to a thermoplastic material without using hot-melt adhesive, the method comprising the steps of:

providing an article;

heating a thermoplastic portion of the article;

placing, by placing means, that heated portion of the article on a portion of the thermoplastic material to heat and thus activate said portion of the thermoplastic material, and allowing or causing the heated portions of said article and said material to cool, to thereby become bonded together, characterized in that said allowing or causing is accompanied by advancing said article, said thermoplastic material and said placing means in unison.

According to a fourth aspect of the present invention, there is provided apparatus for use in attaching an article to a thermoplastic material without hot-melt adhesive, comprising:

heating means for heating a thermoplastic portion of said article; and placing means for placing that heated portion of the article on a portion of said material to heat and thus activate said portion of said material;

characterized by advancing means for advancing said material along a path; and driving means connected to said placing means for displacing said placing means and thus said article along said path in unison with said material.

Owing to these aspects of the invention, it is possible to ensure that the article becomes reliably bonded to the thermoplastic material even if the material is being advanced at a relatively high rate during cooling; not only can the placing means serve to hold the article in a fixed position relative to the advancing material, but it can be provided with cooling means which can cool the heated portions as they advance.

According to a fifth aspect of the present invention, there is provided apparatus for use in attaching an article to a thermoplastic material, comprising:

advancing means for advancing said material along a path;

heating means for heating a thermoplastic portion of said article;

placing means for placing that heated portion of the article on a portion of said material to heat and thus activate said portion of said material;

material-loading means arranged to load said material onto said advancing means; and article-loading means arranged to load said article onto said placing means;

characterized by material-detecting means arranged to detect said material in correct position ready for loading onto said advancing means;

and article-detecting means arranged to detect said article in correct position ready for loading onto said placing means;

the arrangement being such that neither said material-loading means nor said article-loading means is operable unless said material-detecting means detects such correctly positioned material and said article-detecting means detects such correctly positioned article.

Owing to this aspect of the invention, it is possible to avoid either of the article and the material being loaded when the other is not in its correct position ready for loading.

Preferably, cooling means is connected to the placing means for cooling the placing means and thereby the heated portions of the article and the material, the placing means being cooled throughout the heating, and also subsequently to cause the heated portions of the article and the material to cool, to thereby become bonded together. In this manner, the cooling serves the two purposes of preventing overheating of the placing means and of causing bonding together of the article and the material.

The advancing may be continuous or indexed and may be linear or rotary.

The invention is particularly applicable to securing a thermoplastic article to a thermoplastic coating of a laminate, in particular securing a thermoplastic, pour spout fitment to a thermoplastic-coated container. Preferably, at least an anchoring flange of the pour spout fitment is heated remotely by a suitable heating mechanism, to a predetermined temperature below the melting point of the thermoplastic of the flange, such that, when the fitment is applied to a selected surface of the thermoplastic-coated container, the thermal energy is transferred to the latter surface at a rate capable of activating the thermoplastic coating; upon cooling, the fitment and the container surface bond together. Although the present system can be employed to fix the fitment to the container before filling of the container, it is particularly applicable downstream of any forming, filling and sealing apparatus for the container.

BRIEF DESCRIPTION OF THE DRAWINGS

In order that the invention may be clearly understood and readily carried into effect, reference will now be made, by way of example, to the accompanying drawings, in which:

FIG. 1 is a plan view of a thermoplastic-coated paperboard blank having been formed, scored and cut from a laminate web;

FIG. 2 is a top perspective view of a gable-top container formed from the blank of FIG. 1, and of a pour spout fitment to be mounted on the container;

FIG. 2A is a fragmentary, top perspective view of a flat-top container formed from a suitable blank;

FIG. 2B is a fragmentary, top perspective view of a one-sided slant-top container formed from a suitable blank;

FIG. 2C is a fragmentary, top perspective view of a slant-top container formed without a gable;

BEST MODE OF CARRYING OUT THE INVENTION

Figure 3:
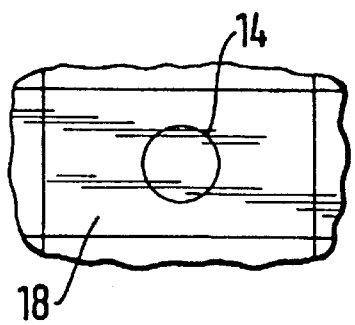
FIGS. 3 and 4 are fragmentary plan views of alternate arrangements of a part of the FIG. 1 blank.
Figure 4:
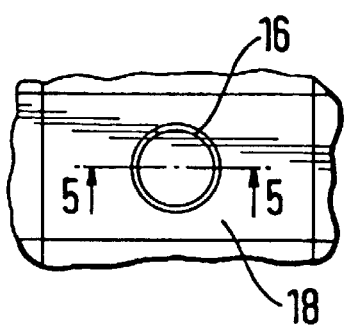
Figure 5:
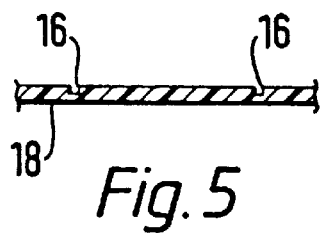
FIG. 5 is an enlarged cross-sectional view taken along the plane of the line 5—5 of FIG. 4, and looking in the direction of the arrows.

Referring now to the drawings in greater detail, FIG. 1 shows a thermoplastic-coated blank 10 which has been scored and cut from a laminate web comprised of paperboard coated on both faces with a suitable polymer, for example polyethylene. The blank has a pour spout opening 12 (see the blank 10 of FIGS. 1 and 2) or a weakened circular score line 14 (FIG. 3) or a partially cut circular line 16 (FIGS. 4 and 5) formed in a panel 18 thereof. The blank 10 is formed into gable-top container 20 (FIG. 2). However, blanks of other designs may be formed into a flat-top container 20A (FIG. 2A), a one-sided slant-top container 20B (FIG. 2B), or a slant-top container 20C (FIG. 2C), in well known manners on typical forming, filling and sealing machines (not shown)

A pour spout fitment 22 includes a body 24 and an external mounting flange 26. It may incorporate any preferred design insofar as the internal openable configuration is concerned.

Figure 6:
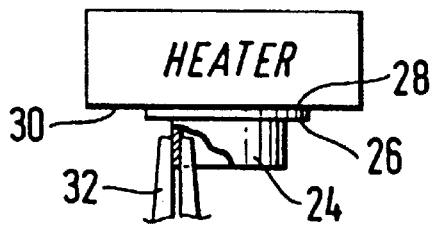
FIG. 6 is a fragmentary schematic view illustrating, in principle, the pour spout fitment of FIG. 2 being heated by an external heater.
Figure 7:
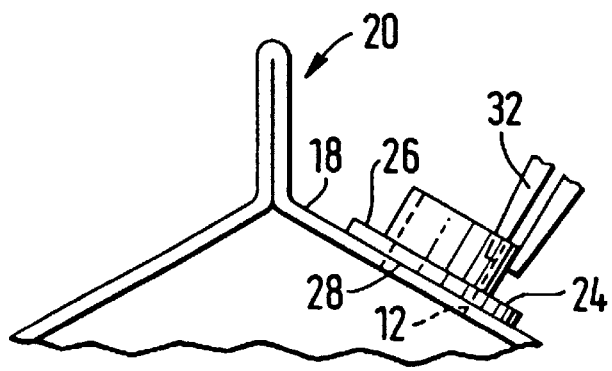
FIG. 7 is a fragmentary view illustrating, in principle, the fitment being applied to the container of FIG. 2.
Figure 8:
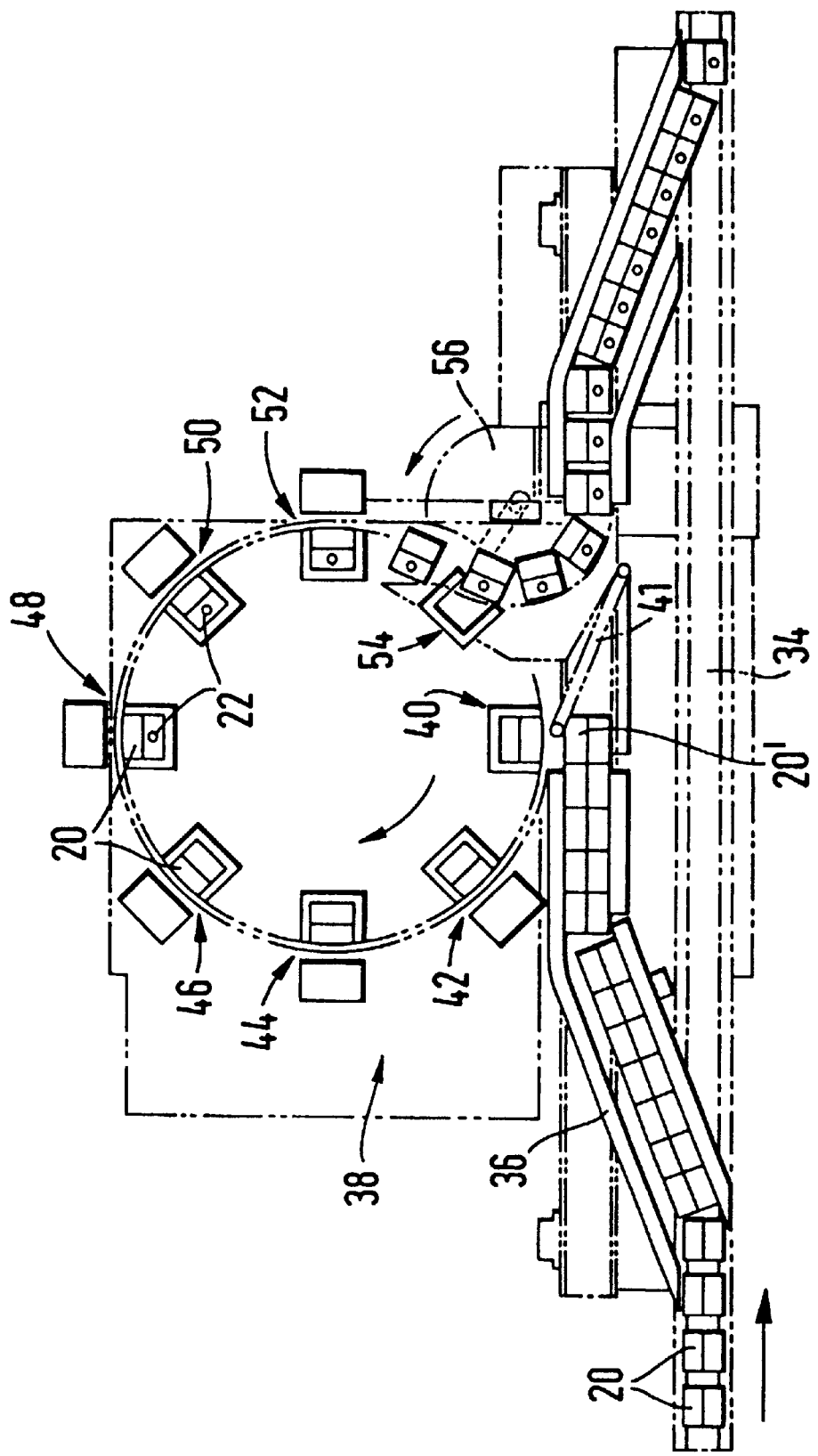
FIG. 8 is a diagrammatic, top plan view of an apparatus for applying such pour spout fitments to such containers.

After having been formed, filled, and sealed, the container 20, 20A, 20B, or 20C, is ready to receive the pour spout fitment 22. The fitment 22 may be formed of any suitable material, such as high density polyethylene (HDPE). By any suitable placing means, diagrammatically represented as 32 (FIGS. 6 and 7), the fitment 22 is presented so that the bottom surface 28 (FIG. 6) of the flange 26 is subjected to heat at a predetermined temperature without melting or combusting, from a suitable heater, represented as 30. Upon its flange 26 reaching a temperature which is still significantly (say at least 5° C., preferably between 5° C. and 15° C.) below its melting point, the pour spout fitment 22 is placed by the placing means 32 onto the panel 18 around the opening 12 or the weakened score line 14 or the partially cut line 16.

It should be noted that the thermal energy required to be supplied to the flange 26 by the heater 30 depends upon various parameters, such as:

a. the melting point of the material,
b. the storage temperature of the spouts,
c. the ambient temperature on the machine, and
d. the humidity.

By the time of contact with the polyethylene-coated panel 18, the surface 28 of the heated fitment 22 has absorbed and retained sufficient heat to activate the polyethylene on the contacted surface of the panel. Upon cooling, the flange 26 and the panel 18 become bonded together.

Referring to FIGS. 8 to 14, the apparatus shown is intended to be included at the downstream end of a carton form-fill-seal machine. The cartons 20 advancing in an indexed manner from a top sealing station of the machine are diverted from a conveyor path 34 (employed for cartons which are to be delivered to the customer without pour spout fitments 20) onto a conveyor branch path 36 which extends past a rotary turret 38 before rejoining the path 34. The turret 38 has eight stations distributed in a horizontal ring. A carton-and fitment-loading station 40, into which the cartons are loaded in turn by a carton infeed mechanism 41, is followed in, a clockwise sense, by a plurality of, in this case three, heating stations 42, 44 and 46, a plurality of, in this case three, empty stations 48, 50 and 52, and a discharge station 54. A discharge wheel 56 returns the cartons 20, now provided with the fitments 22, to the conveyor branch path 36.

The rotary turret 38 comprises upper and lower discs 58 and 60 of which the disc 58 is fixed to a rotary, central, driving column 62 mounted at its lower end in an annular bearing 64. The disc 58 carries vertical, externally threaded rods (of which one is shown and referenced 66) turnable about their own axes by driven pinions (of which one is shown and referenced 68). The lower disc 60 is mounted on the rods 66 by way of running nuts (of which one is shown and referenced 70) which are fixed to the disc 60 and whereby turning of the rods 66 adjusts the vertical position of the disc 60, to adjust for different heights of carton 20 to be advanced by the discs 58 and 60, a lower position of the disc 60 for a taller carton 20 being shown in full lines and a higher position of the disc 60 for a shorter carton 20 being shown in dot-dash lines in FIG. 11. The disc 58 is formed with a plurality of, in this case eight, peripheral recesses 72 which receive the cartons 20 and directly beneath which are respective brackets 74 which support the cartons and which are fixed on the disc 60. Fixed to the disc 58 above the column 62 is an inlet/outlet piece 76 for cooling water.

Radially aligned with the respective recesses 72 and fixed to the top surface of the disc 58 are fitment-applicator 78 including fitment-placers 79 which receive respective fitments 22 at the loading station 40, present the axially outermost surfaces of the flanges 26 to jets of hot air emitted by nozzles 80 at the heating stations 42 to 46 whereby the temperature of each flange is raised to a level significantly below its melting point, rapidly apply each hot fitment flange 26 to its carton 20 between the stations 46 and 48, press the flanges 26 onto their cartons 20 from the stations 48 to 52, during which movement the fitments 22 and the cartons 20 are indirectly cooled by the cooling water introduced at the piece 76 to bond the flanges 26 to the cartons 20, and lift from each fitment 22 between the stations 52 and 54. Each placer 79 includes a holder 82 formed with a recess 84 for receiving the body 24 of the fitment 22, with the flange 26 remaining outside the holder. A leaf spring 86 retains the body 24 in the recess 84 against the action of a plunger 88 urged axially outwards by a helical compression spring 90. The placer 79 is attached, in such manner as to be adjsutable about a horizontal axis, to an elbow 92 itself fixed to a horizontal hollow pivot 94 extending tangentially to a circle concentric with the disc 58. Mounted on the elbow 92 so as to be swivelleable about a radious of the pivot 94 is a fork 96 which embraces a camming ring 98 and which mounts roller followers 100 which closely receive the ring 98 between them. The pivot 94 is mounted in a bearing 102 fixed to a plate 104 itself fixed to the disc 58. The ring 98, which is fixed to the machine frame by way of brackets (106), guides the nodding motion of the assembly 79, 92, 94, 96, 100 about the axis of the pivot 94 as the applicator 78 rotates with the disc 58, the assembly performing one oscillation for each revolution of the applicator 78.

Figure 9:
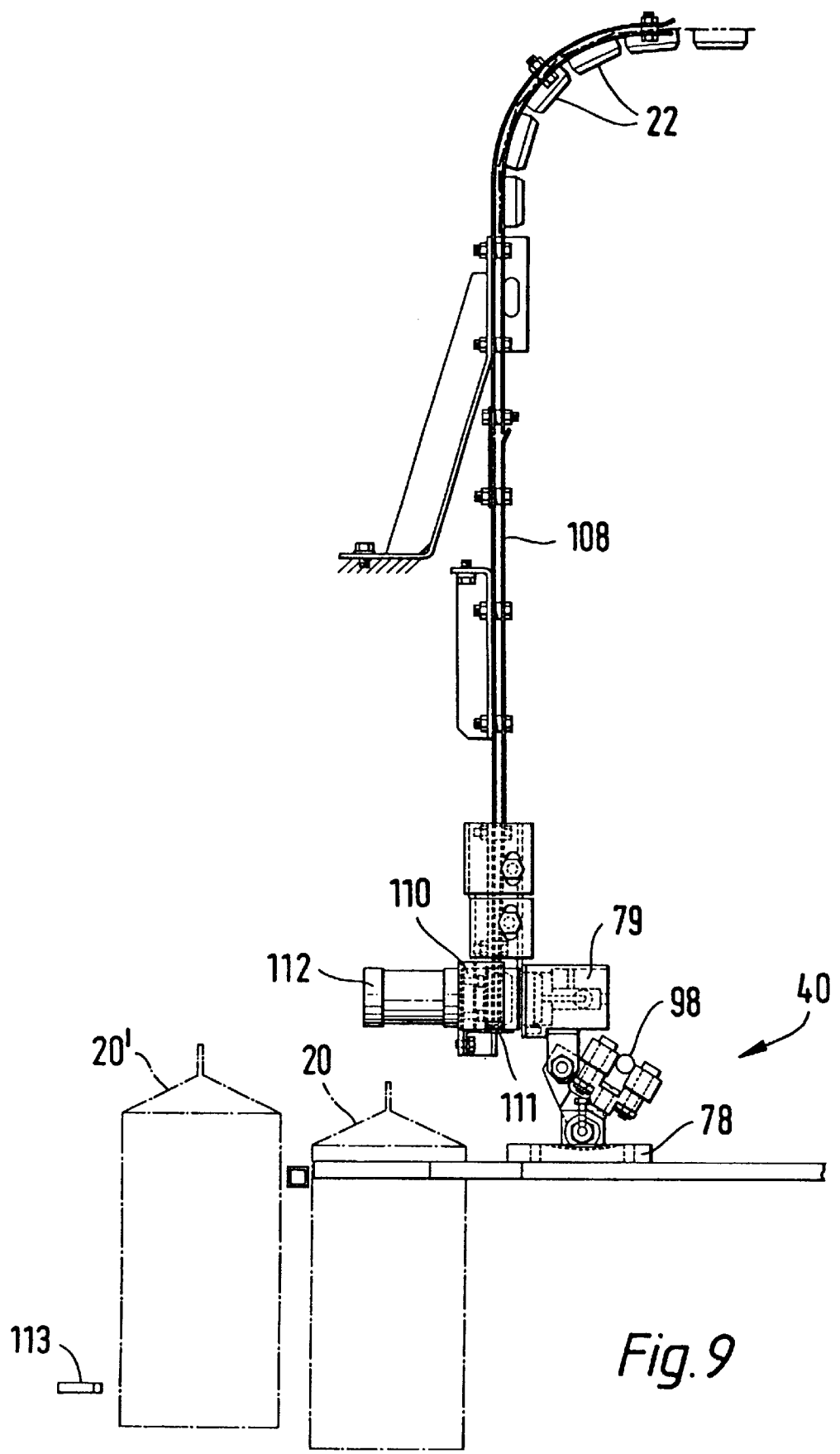
FIG. 9 is a side elevation of a fitment-loading part of a container—and fitment-loading station.
Figure 10:
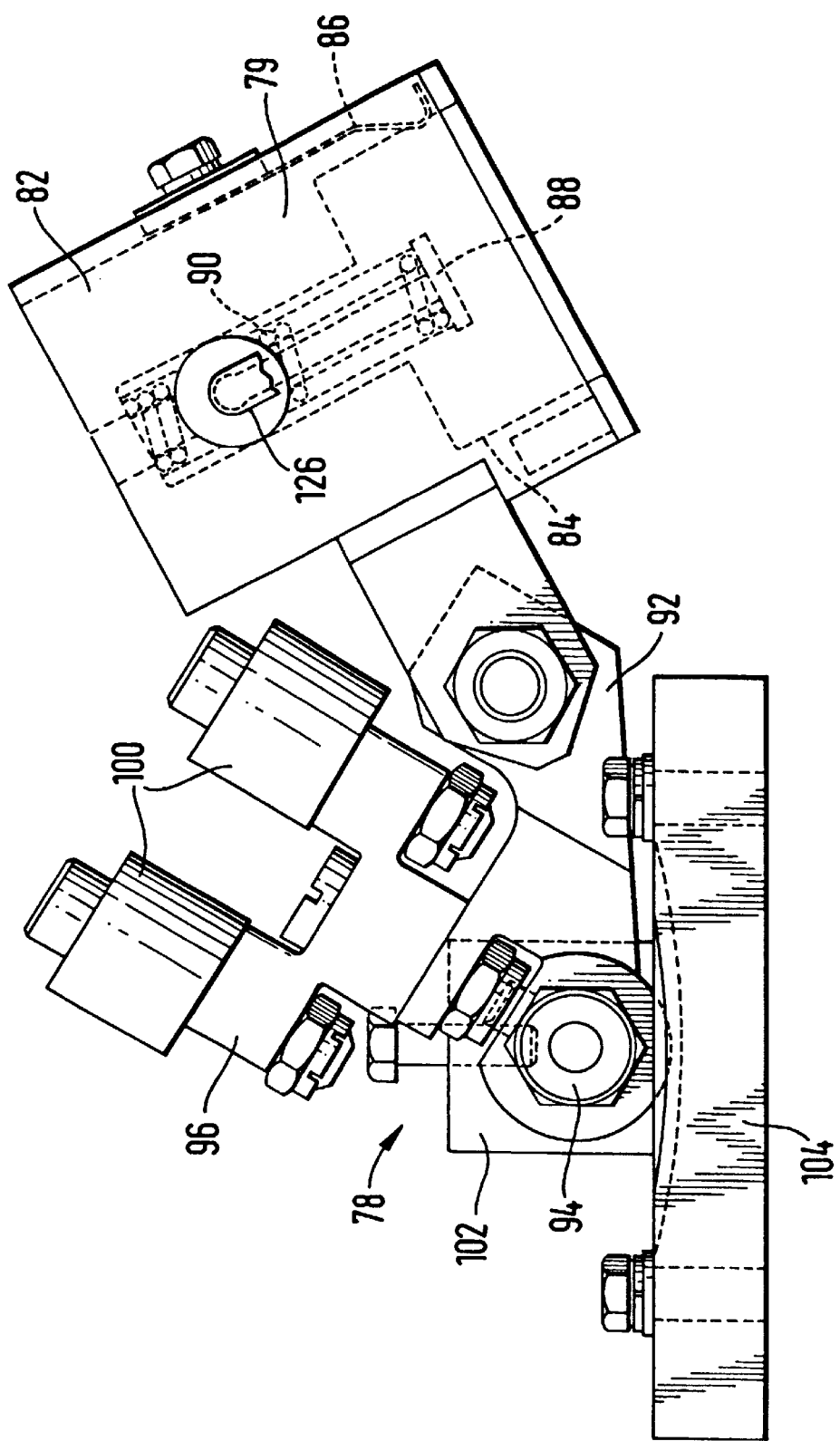
FIG. 10 is a side elevation of one of a plurality of identical fitment-applicators of the apparatus.
Figure 11:
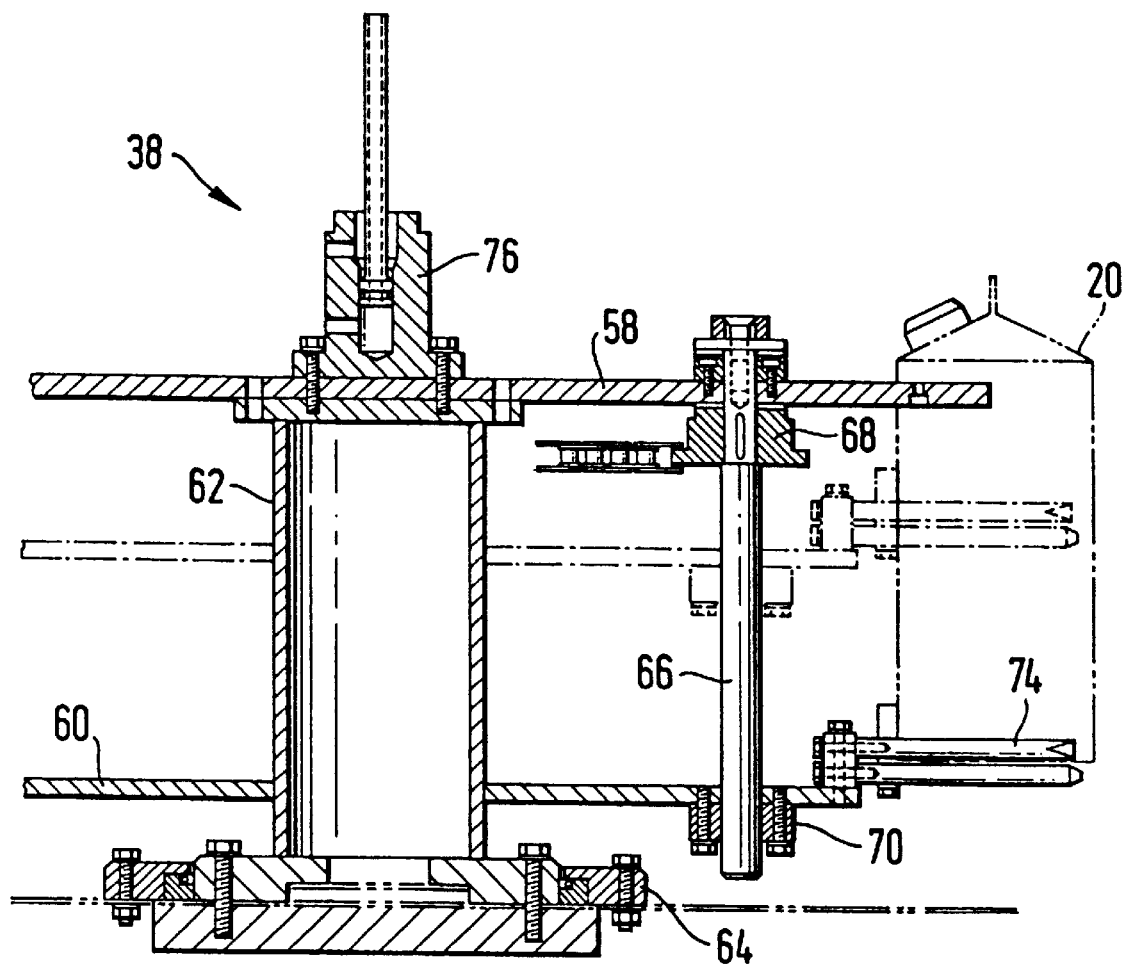
FIG. 11 is vertical axial section through a rotary turret of the apparatus.
Figure 12:
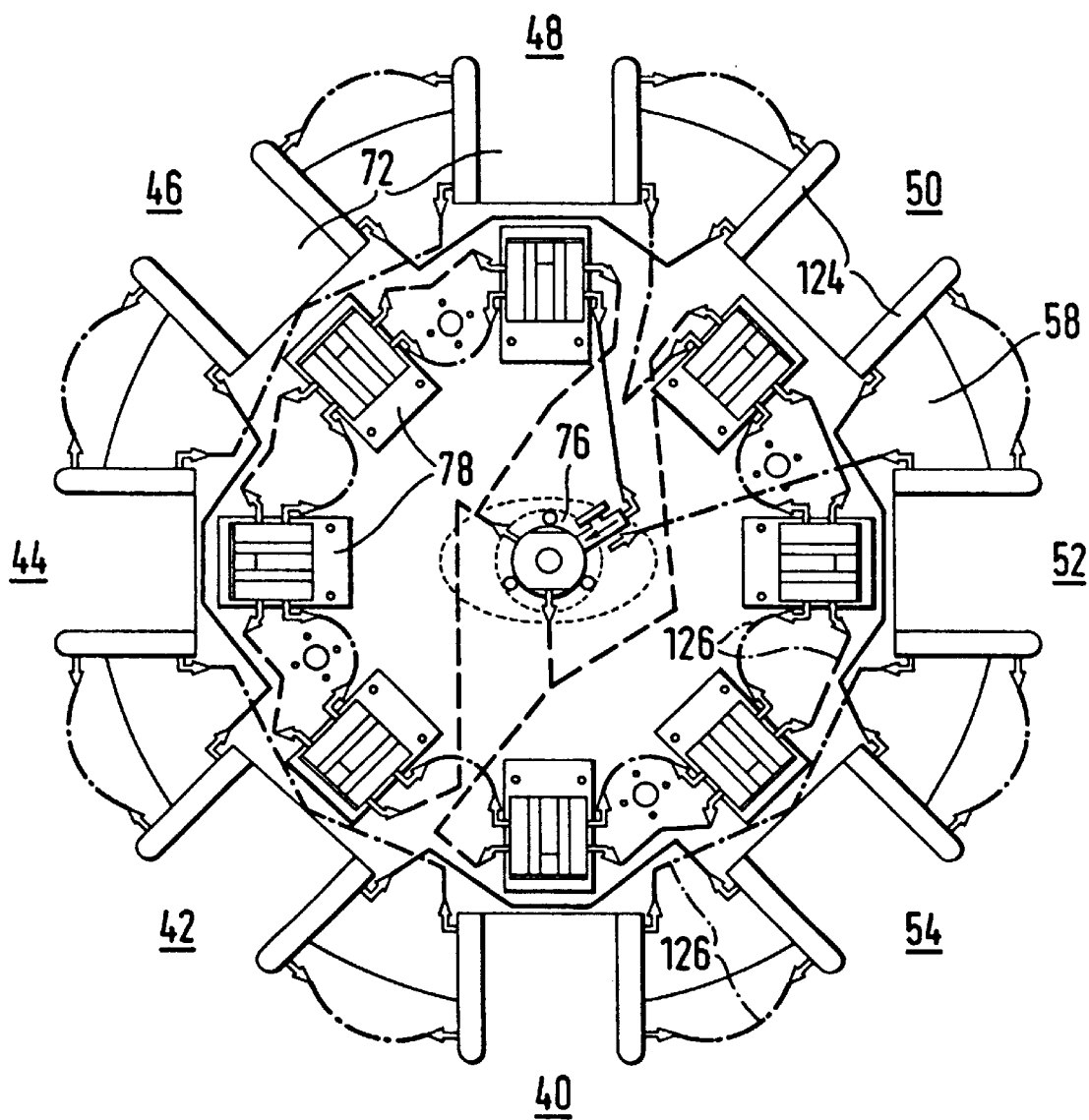
FIG. 12 is a top plan view of the turret, particularly illustrating the routing of cooling water through the turret.
Figure 13:
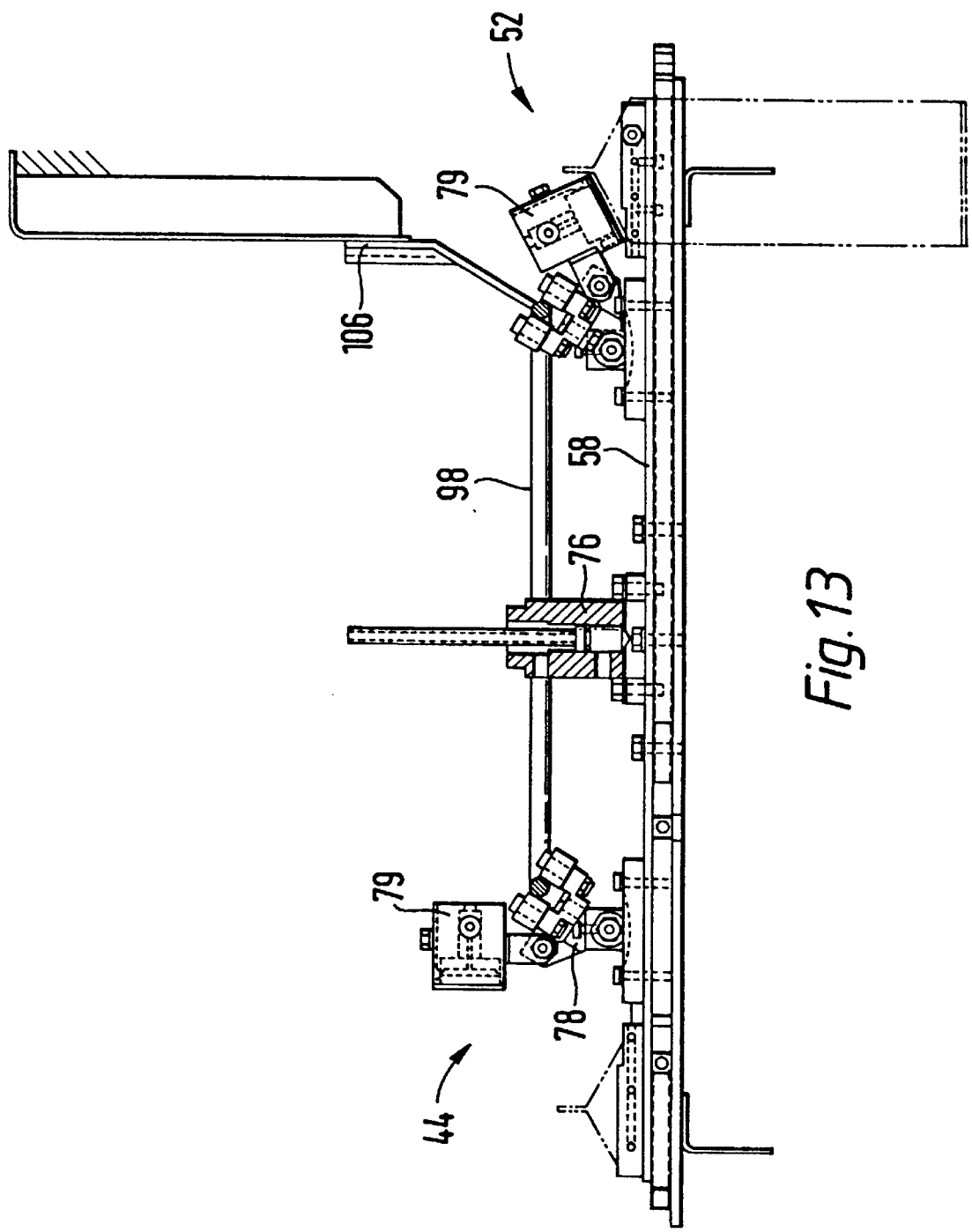
FIG. 13 is a side elevation of an upper part of the turret, showing the same in more detail.
Figure 14:
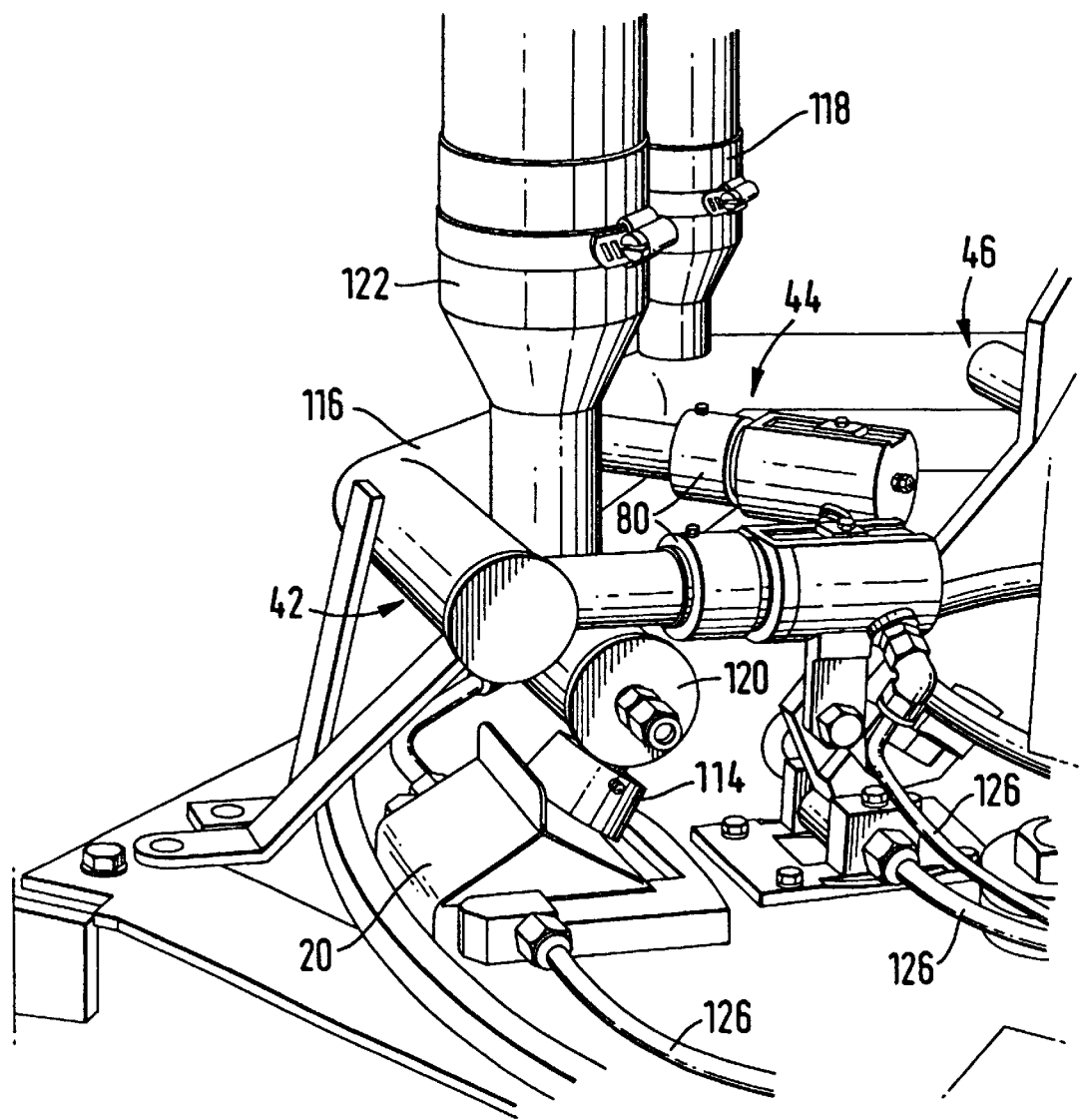
FIG. 14 is a top perspective view of three heating stations of the apparatus.

At the loading station 40, the fitments 22 are fed one after another down a track 108 to a loading head 110, where a detector 111 detects the presence of a fitment in the correct position in the head 110. The fitment is pushed horizontally from the head 110 into the placer 79 by means of a pneumatic piston-and-cylinder device 112, when the placer 79 arrives at the station 40, in which it has an upright orientation, as illustrated in FIG. 9, and which it retains until it leaves the final heating station 46. However, the fitment is not pushed from the head 110 unless a detector 113 detects the presence of a carton at 20' in the branch path 36 ready to be loaded by the mechanism 41. Since, in addition, the carton at 20' is not infed by the mechanism unless the detector 111 detects a correctly positioned fitment 22 in the head 110, the risk of a carton being loaded without a fitment being loaded, or vice versa, is avoided. At the first heating, station 42, the flange 26 directly faces the hot air nozzle 80 of the station 42, while the surface portion of the roof of the gable top carton 20 to which the flange 26 is to be applied directly faces another nozzle 114 through which hot air is applied. At the second and third heating stations 44 and 46, the flange 26 again directly faces their nozzles 80 and is further heated by the air jets therefrom, to raise the temperature of the flange stepwise. The three nozzles 80 are fed with hot air from a manifold 116 supplied through thermally insulated ducting 118. The nozzle 114 at the station 42 is followed by corresponding nozzles at the stations 44 and 46, and the three nozzles 114 are fed from a manifold 120 supplied through thermally insulated ducting 122. Thereby, the temperature of that surface portion of the roof of the carton is heated progressively to a temperature rendering that surface portion aseptic and dry. As the carton and the fitment leave the station 46, the assembly 79, 92, 94, 96, 100 is turned by the camming ring 98 to nod the placer 79 forwards and downwards to apply the fitment to the carton. The placer 79 retains that downwardly nodded orientation for its travel between the stations 48 and 52.

The cartons 20 and the fitments 22 are continuously cooled throughout their travel round the turret, by cooling water passed through the holders 82, the pivots 94, and through pairs of carton-locating members 124 fixed to the top surface of the disc 58 at respective opposite sides of the respective recesses 72. This cooling water is supplied to the holders 82, the elbows 92 and the members 124 from the piece 76, the outward and return routes of the water being indicated by the arrowed dot-dash lines 126 in FIG. 12, examples of the actual ducting being shown at 126 in FIGS. 10 and 14. It is the presence of the cooling water between the stations 46 and 52 which progressively cools the flange 26 and the carton between those stations, to bond the flange 20 firmly to the carton. As the carton (now carrying the fitment) and the placer 79 leave the station 52, the placer 79 is turned, by the ring 98, back into its upright orientation ready to receive another fitment 26.

It appears from experiments that, if the flange 26 and the outermost coating of the container are of the same thermoplastics material, the flange should be of significantly greater thickness than the coating in order to be able to store enough thermal energy to cause the coating surface to fuse thereto when the flange is applied to the coating. It also appears that the material(s) arrangements of the fitment and of the laminate should be such that heat can be readily dissipated from the flange but not from the coating, since otherwise the temperature of the coating might never rise to a level such that the coating becomes tacky or molten for bonding purposes.

It is not essential that the thermoplastic coating to be heated should be on the container; instead, the flange 26 could be the heat-receiving material such as a laminate with an external thermoplastic coating, and the container the heat-giving article. The container could then be a plastics bottle or a laminate carton with a thick external thermoplastic layer portion.

EXAMPLE

In an example of successful bonding of a pour spout fitment to a laminate container, a pour spout fitment of LDPE (low density polyethylene) with a flange thickness of 1 mm. was heated to a temperature of 110° C. to 121° C. (230° F. to 250° F.) and applied to the outermost layer of a gable-topped carton consisting of a laminate 0.71 mm. thick and containing the following layers progressing inwardly of the carton:

(i) an outermost layer of LDPE of 14 grams/ream
(ii) a paperboard layer of 272 grams/ream
(iii) an LDPE layer of 18 grams/ream
(iv) an Al (Aluminium) foil layer of 24 grams/ream
(v) a "SURLYN" layer of 6 grams/ream
(vi) an innermost layer of LDPE of 50 grams/ream.

It may be desirable to pre-heat the surface of the container to be contacted by the heated fitment 22, in order to ensure that such surface is aseptic and dry.

Industrial Applicability

It should be apparent that the invention provides a novel method of applying a pour spout fitment to a thermoplastic-coated container.

It should also be apparent that, by heating a pour spout fitment to a predetermined temperature remote from a thermoplastic-coated container, there is no need for employing the heretofore well known methods of (1) applying heat to a container surface in conjunction with pressure against a flange of the pour spout fitment, wherein the container surface is backed up by a support mechanism, such as a mandrel or an anvil; or (2) applying ultrasonic vibration and pressure to a fitment flange and container panel combination; or (3) applying a hot melt or an adhesive to the bottom surface of a fitment and mounting same on a container panel.

It should be still further apparent that the erected or formed container provides a box-type support, capable of being subjected to the application pressure involved, without the need for a mandrel or anvil back-up, as heretofore used to withstand the sealing pressures required.

What is claimed is:

1. A method of attaching an article to a thermoplastic layer of a laminate without using hot-melt adhesive, the method comprising the steps of:

providing an article;

heating a thermoplastic portion of the article to a temperature no higher than the melting point of the thermoplastic substance of said portion of the article;

placing that heated portion of the article on a portion of the thermoplastic layer to heat said portion of the thermoplastic layer and thus convert said portion of the thermoplastic layer from a non-tacky condition to a tacky condition, said portion of the article having a thermal capacity higher than that of said portion of the layer; and one of allowing and causing the heated portions of the article and the layer to cool, to thereby become bonded together.

2. A method according to claim 1, wherein said temperature is below said melting point.

3. A method according to claim 1, wherein said article is a pour spout fitment.

4. A method according to claim 1, wherein said laminate comprises a paperboard layer coated with said thermoplastic layer.

5. A method according to claim 1, wherein said portion of said thermoplastic layer is pre-heated to a predetermined temperature to assure that said portion of said thermoplastic layer is dry.

6. A method according to claim 1, wherein said laminate is in the form of an erected container.

7. A method according to claim 6, wherein the placing step is preceded by forming, filling, and sealing the container.

8. A method according to claim 1, wherein said heating is without contact between any heating member and said portion of the article.

9. A method according to claim 1, wherein said article and said thermoplastic layer move in unison while said portions are allowed or caused to cool, and wherein said placing is performed by a placing device which moves with said article and said thermoplastic layer while said portions are allowed or caused to cool.

10. A method of attaching an article to a thermoplastic coating on a paperboard layer of a laminate in the form of an erected container, without using hot-melt adhesive, the method comprising the steps of:

pre-heating a portion of said coating to a predetermined temperature to assure that said portion of said coating is dry;

providing an article in the form of a pour spout fitment;

heating a thermoplastic portion of the article, said heating being without contact between any heating member and said portion of the article;

placing that heated portion of the article on the, pre-heated portion of the thermoplastic coating to heat said portion of the thermoplastic coating and thus convert said portion of the thermoplastic coating from a non-tacky condition to a tacky condition, and one of allowing and causing the heated portions of said article and said coating to cool, to thereby become bonded together.

11. A method according to claim 10, wherein said placing is preceded by forming, filling, and sealing the container.

12. A method of attaching an article to a thermoplastic material without using hot-melt adhesive, the method comprising the steps of:

providing an article;

heating a thermoplastic portion of the article;

placing, by a placing device, that heated portion of the article on a portion of the thermoplastic material to heat said portion of the thermoplastic material and thus convert said portion of the thermoplastic material from a non-tacky condition to a tacky condition, and one of allowing and causing the heated portions of said article and said material to cool, to thereby become bonded together, said one of allowing and causing being accompanied by advancing said article, said thermoplastic material and said placing device in unison.

13. A method according to claim 12, wherein said article is a pour spout fitment and said thermoplastic coating on a paperboard layer of a laminated in the form of an erected container.

14. A method according to claim 13, wherein said placing is preceded by forming, filling, and sealing the container.

15. A method according to claim 12, wherein said placing device carries said article past a heating device which performs said heating.

16. A method according to claim 12, and further comprising cooling said placing device and thereby causing said heated portions to cool as aforesaid.

17. Apparatus for use in attaching an article to a thermoplastic material without hot-melt adhesive, comprising:

a heater adapted to heat a thermoplastic portion of said article;

placing means for placing that heated portion of the article on a portion of said material to heat and thus activate said portion of said material;

advancing means for advancing said material along a path; and driving means connected to said placing means for displacing said placing means and thus said article along said path in unison with said material;

said heater not being adapted to heat said portion of said material.

18. Apparatus according to claim 17, and further comprising cooling means connected to said placing means for cooling said placing means and thereby the heated portions of said article and said material.

19. Apparatus according to claim 17, and further comprising endless camming means arranged to oscillate said placing means about an axis and transversely of said path between an article-receiving orientation and an article-placing orientation.

20. Apparatus according to claim 19, and further comprising swivelling cam follower means embracing said endless canmming means and connected to said placing means so as to oscillate therewith about said axis but so as to be rotatable relative thereto about a second axis substantially perpendicular to the first-mentioned axis.

21. Apparatus according to claim 17, and further comprising material-loading means arranged to load said material onto said advancing means, material-detecting means arranged to detect said material in correct position ready for loading onto said advancing means, article-loading means arranged to load said article onto said placing means, and article-detecting means arranged to detect said article in correct position ready for loading onto said placing means, the arrangement being such that neither said material-loading means nor said article-loading means is operable unless said material-detecting means detects such correctly positioned material and said article-detecting means detects such correctly positioned article.

22. Apparatus for use in attaching an article to a thermoplastic material, comprising:

advancing means for advancing said material along a path;

a heater adapted to heat a thermoplastic portion of said article;

placing means for placing that heated portion of the article on a portion of said material to heat and thus activate said portion of said material;

material-loading means arranged to load said material onto said advancing means; and article-loading means arranged to load said article onto said placing means;

material-detecting means arranged to detect said material in correct position ready for loading onto said advancing means; and article-detecting means arranged to detect said article in correct position ready for loading onto said placing means;

the arrangement being such that neither said material-loading means nor said article-loading means is operable unless said material-detecting means detects such correctly positioned material and said article-detecting means detects such correctly positioned article, said heater not being adapted to heat said portion of said material.

23. A method of applying a pour spout fitment to a thermoplastic coating on paperboard of a larninate, the method comprising the steps of:

providing a pour spout fitment;

heating a thermoplastic portion of the fitment;

placing, by a placing device, that heated portion of the fitment on a portion of the thermoplastic coating to heat said portion of the thermoplastic coating and thus convert said portion-of the thermoplastic coating from a non-tacky condition to a tacky condition, cooling said placing device throughout said heating, and also subsequently to cause the heated portions of said fitment and said coating to cool, to thereby become bonded together, and pressing said placing device against said fitment and thus said fitment against said portion of the thermoplastic coating during that cooling of said heated portions.

* * * * *